(12) United States Patent
Soby

(10) Patent No.: US 8,880,522 B2
(45) Date of Patent: *Nov. 4, 2014

(54) GENERATING REPORTS IN AN ONLINE SERVICES SYSTEM

(71) Applicant: salesforce.com, inc., San Francisco, CA (US)

(72) Inventor: Brian Soby, Emeryville, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/023,049

(22) Filed: Sep. 10, 2013

(65) Prior Publication Data

US 2014/0012801 A1 Jan. 9, 2014

Related U.S. Application Data

(63) Continuation of application No. 12/869,684, filed on Aug. 26, 2010, now Pat. No. 8,560,541.

(51) Int. Cl.
*G06F 17/30* (2006.01)

(52) U.S. Cl.
CPC .... *G06F 17/30592* (2013.01); *G06F 17/30557* (2013.01)
USPC ......................................................... 707/736

(58) Field of Classification Search
CPC .................... G06F 17/30011; G06F 17/30283; G06F 17/3087
USPC ......................................................... 707/736
See application file for complete search history.

(56) References Cited

U.S. PATENT DOCUMENTS 7,840,600 B1 * 11/2010 Bhatia ........................... 707/793

\* cited by examiner

*Primary Examiner* — Rehana Perveen
*Assistant Examiner* — Alexander Khong
(74) *Attorney, Agent, or Firm* — Ingrassia Fisher & Lorenz, P.C.

(57) ABSTRACT

A system and method for performing security assessments in an online services system. In one embodiment, the method includes receiving a list of target data for a report; and generating fields in the report. The method also includes populating the fields with composite information; receiving a command to execute the report; fetching the target data using the composite information; and populating the report with the target data.

20 Claims, 5 Drawing Sheets

GENERATING REPORTS IN AN ONLINE SERVICES SYSTEM

CROSS-REFERENCE TO RELATED APPLICATION

This application is a continuation of U.S. application Ser. No. 12/869,684, filed Aug. 26, 2010, the entire contents of which is incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to report generation in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the database system might include the issuance of a query from the user system to the database system. The database system might process the request for information received in the query and send to the user system information relevant to the request.

Cloud service providers utilize database systems to provide resources to its customers as a service. In connection with maintenance and security of database systems, reports are often generated in order to assess the conditions of a given database systems. Reports summarize and aggregate data about a database system, and the data is retrieved from a central database to populate fields of the reports. Such data is typically pushed to and stored at the central database from various sources on a continual basis in order to keep the data from becoming outdated. The continual updating can be time consuming and costly.

BRIEF SUMMARY

Embodiments provide mechanisms and methods for generating reports in an online services system. In one embodiment, a method includes receiving a list of target data for a report; and generating fields in the report. The method also includes populating the fields with composite information; receiving a command to execute the report; fetching the target data using the composite information; and populating the report with the target data.

While embodiments of the present invention may be implemented in a system having an application server providing a front end for an on-demand database service capable of supporting multiple tenants, the present invention is not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for generating reports in an online services system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for generating reports in an online services system will be described with reference to example embodiments.

System Overview

Figure 1:
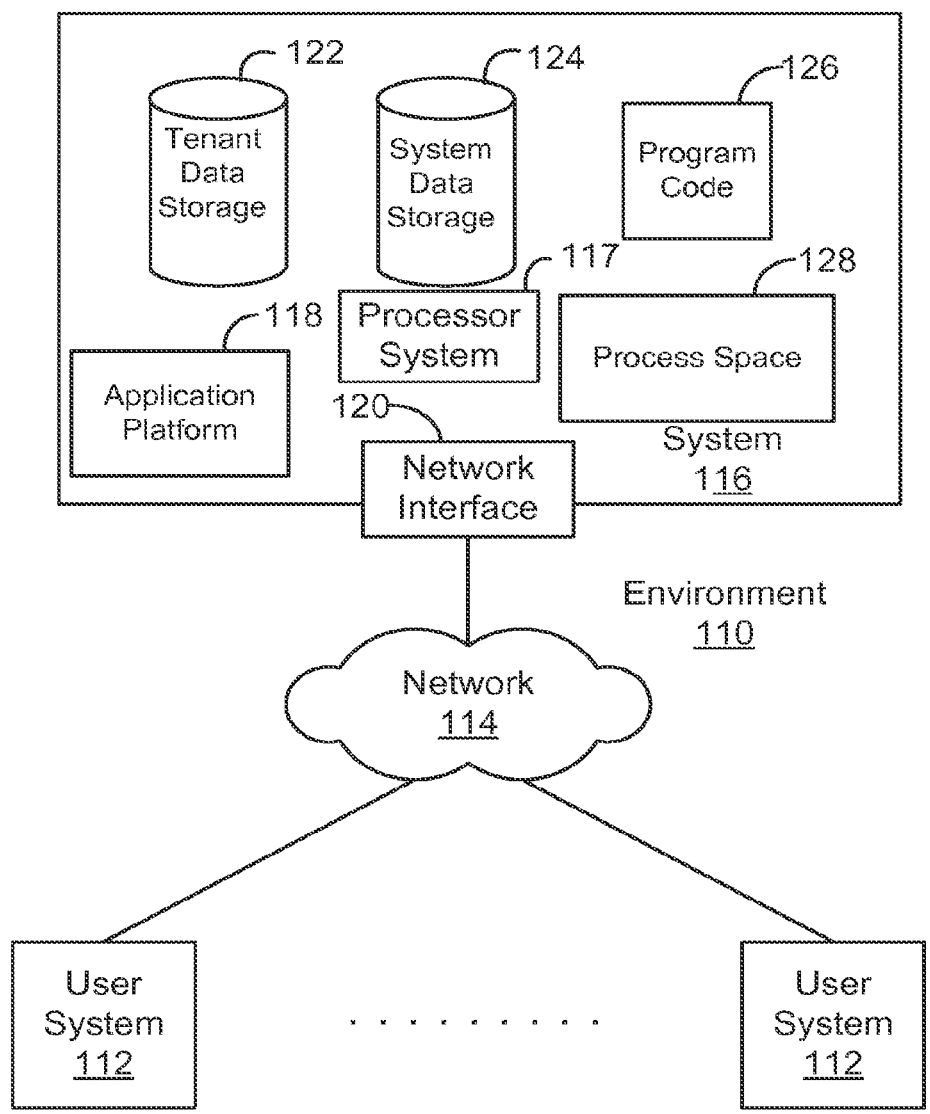
FIG. 1 illustrates a block diagram of an example environment wherein an online services system might be used, and which may be used to implement the embodiments described herein.

FIG. 1 illustrates a block diagram of an example environment 110 where an online services system might be used, and which may be used to implement the embodiments described herein. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116. System 116 may also be referred to as an online services system or cloud service provider. System 116 provides its resources to customers (e.g., end users) as a service.

An on-demand database service, such as system 116, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creating, managing, and executing one or more applications developed by either the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as to provide related data, code, forms, webpages and other information to and from user systems 112. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third-party application developer) software applications, which may or may not include CRM, may be supported by the application platform 118, which manages the creation and storage of the applications into one or more database objects, and executing of the applications in a virtual machine in the process space of the system 116. The terms software application and application are used interchangeably.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application (s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
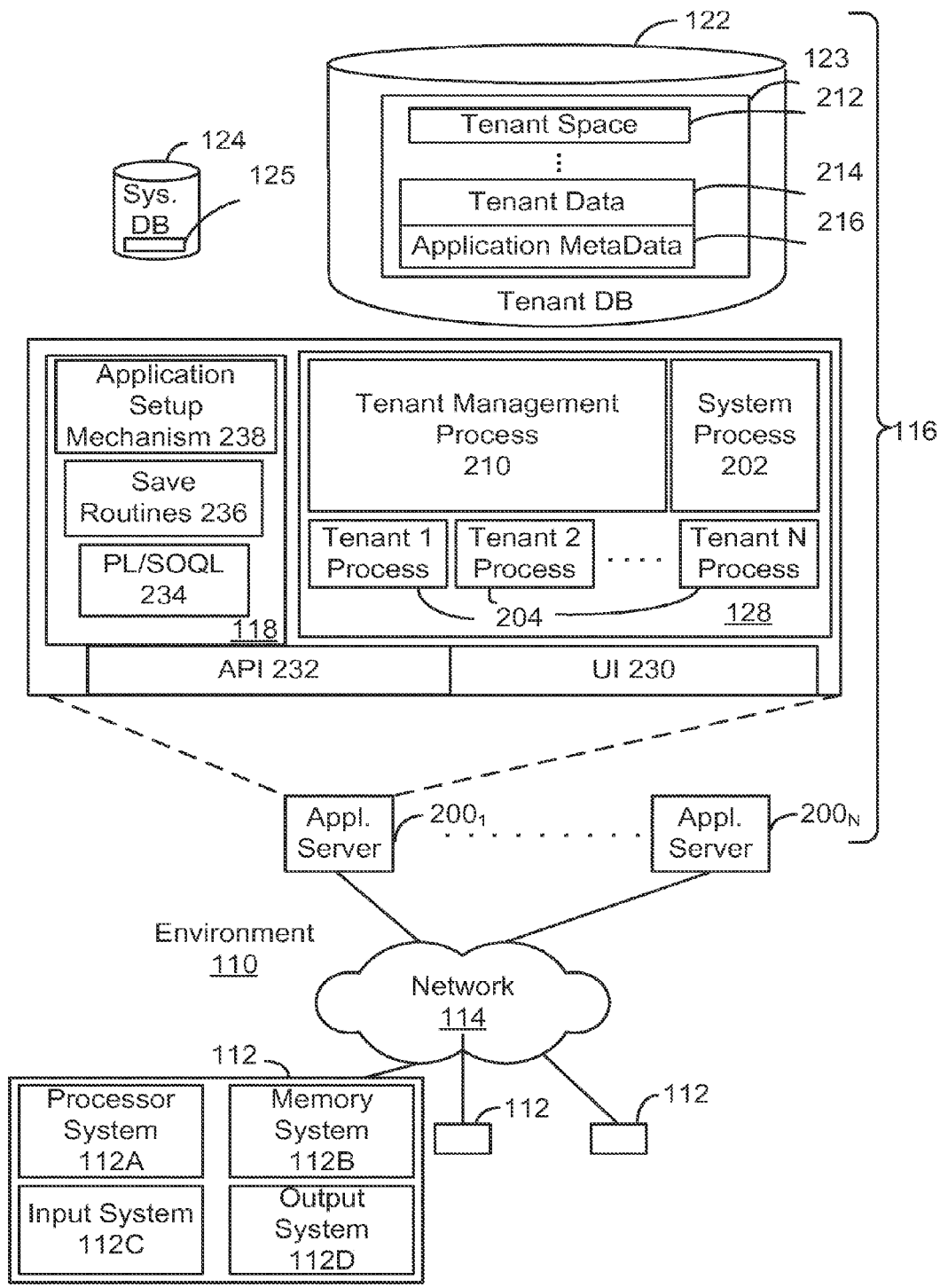
FIG. 2 illustrates a block diagram of another example environment, which may be used to implement the embodiments described herein.

FIG. 2 illustrates a block diagram of another example environment 110, which may be used to implement the embodiments described herein. FIG. 2 also illustrates elements of system 116 and various interconnections, according to one embodiment. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, user interface (UI) 230, application program interface (API) 232, PL/Salesforce.com object query language (PL/SOQL) 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown in FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes and to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210, for example. Invocations to such applications may be coded using PL/SOQL 234 that provides a programming language style interface extension to API 232. Invocations to applications may be detected by one or more system processes, which manage retrieving application metadata 216 for the subscriber, making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer control protocol and Internet protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles the storage of, and access to, different objects, data and applications across disparate users and organizations.

As an example of storage, one tenant might be a company that employs a sales force where each salesperson uses system 116 to manage his or her sales process. Thus, a user might maintain contact data, leads data, customer follow-up data, performance data, goals and progress data, etc., all applicable to that user's personal sales process (e.g., in tenant data storage 122). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 700 in system 116) automatically generates one or more structured query language (SQL) statements (e.g., one or more SQL queries) that are designed to access the desired information. System data storage 124 may generate query plans to access the requested data from the database.

Figure 3:
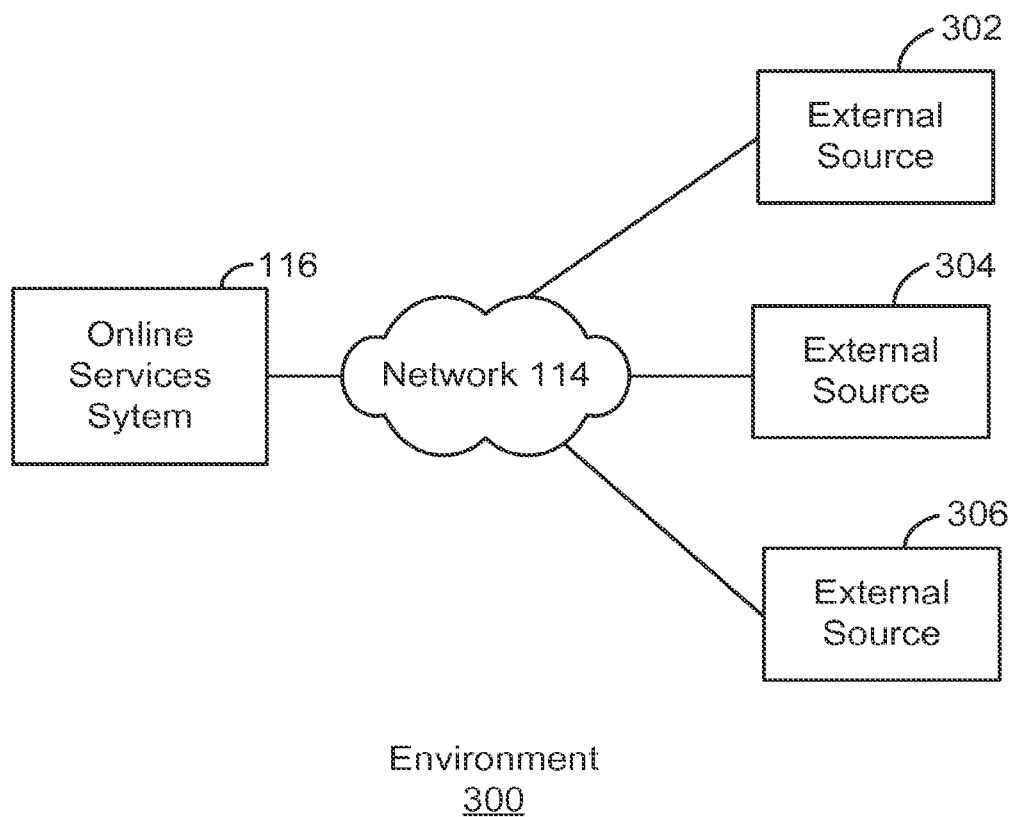
FIG. 3 illustrates a block diagram of another example environment, which may be used to implement the embodiments described herein.

FIG. 3 illustrates a block diagram of another example environment 300, which may be used to implement the embodiments described herein. As shown in FIG. 3, environment 300 includes an online service system (e.g., system 116), which communicates with one or more external sources 302, 304, and 306 via a network 114. External sources 302, 304, and 306 may include, for example, third-party providers that perform security assessments. For ease of illustration, only three external sources are shown. There may be more external sources, depending on the specific implementation. In one embodiment, network 114 may include the Internet and/or other suitable networks.

In one embodiment, system 116 provides an application exchange (e.g., AppExchange), where partners (e.g., third-party application providers) may provide third-party applications and be listed on the application exchange. System 116 and/or third-party security assessment providers may perform security assessments to detect security vulnerabilities associated with system 116 and/or third-party applications.

As described in detail below, embodiments described herein provide reports, which include data aggregations from data generated by multiple systems internal and external to an online services system. These data aggregations provide useful metrics and other statistics in the reports. Because the metrics are constantly changing and are accessed through different mechanisms, the data (referred to as target data) is fetched directly from the internal and external sources using composition information, as opposed to the target data being fetched from a centralized data repository that needs to be periodically updated. As described in more detail below, the composition information contains all information (e.g., access credentials) necessary to retrieve target data in real-time from a variety of internal and external sources.

Figure 4:
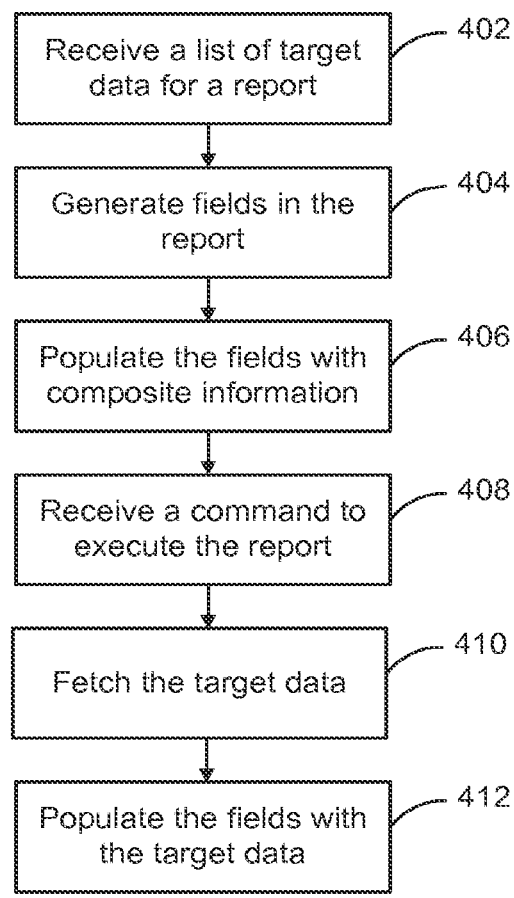
FIG. 4 illustrates an example simplified flow diagram for generating reports in an online services system.

FIG. 4 illustrates an example simplified flow diagram for generating reports in an online services system. The method is initiated in block 402, where system 116 receives a list of target data for a report. In one embodiment, the target data (also referred to as reporting targets) is information including metrics that a user would like in the report. In one embodiment, system 116 may display a master list of target data (e.g., number of vulnerabilities, average scan time, etc.) and enable the user to select or drag desired target data from the master list into the report. In one embodiment, system 116 may also receive text from the user describing the list of desired target data.

In block 404, system 116 generates fields in the report, where the fields correspond to different target data. For example, in one embodiment, each field may be associated with a different item from the list of desired target data. In block 406, system 116 populates the fields with composite information that is associated with target data. For example, in one embodiment, each field may be populated with composite information associated with a different item from the list of desired target data.

Figure 5:
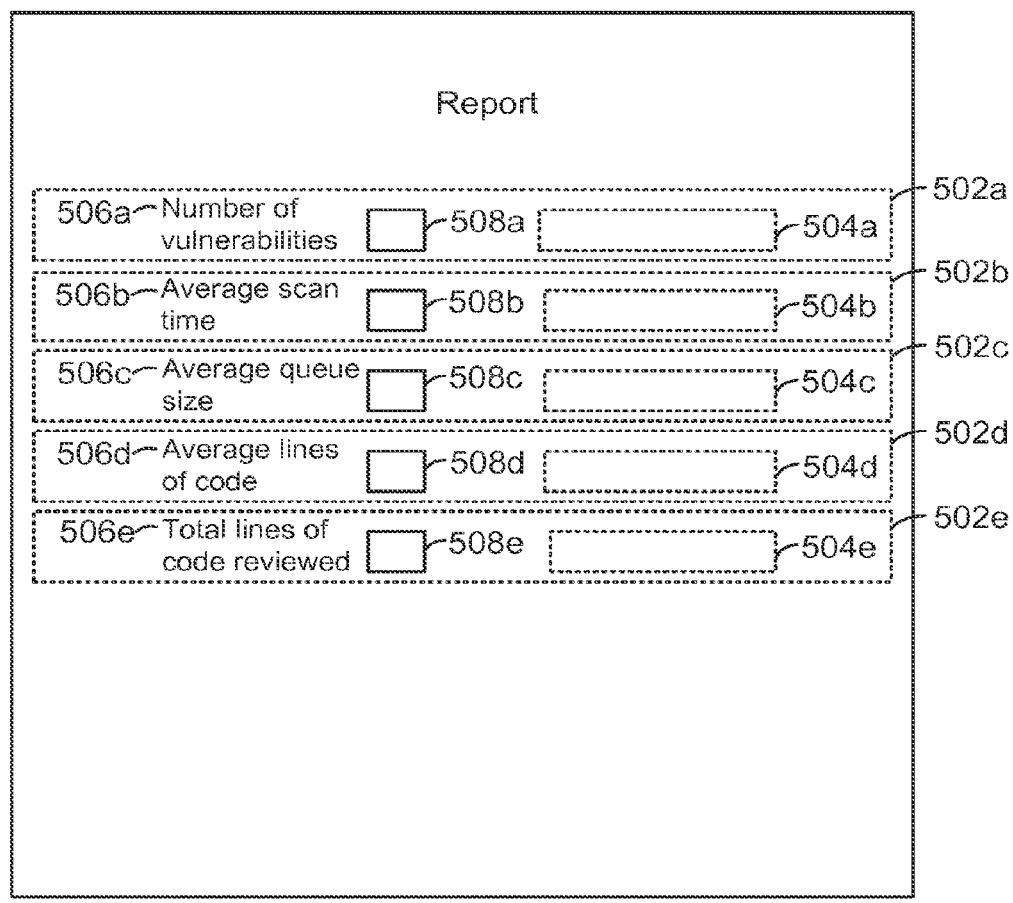
FIG. 5 illustrates an example report, which may be generated by embodiments described herein.

FIG. 5 illustrates an example report 500, which may be generated by embodiments described herein. As FIG. 5 shows, report 500 may have multiple fields 502a, 502b, 502c, 502d, 502e, etc. Fields 502 contain composition information 504a, 504b, 504c, 504d, 504e, etc. In one embodiment, the composition information is not visible to the user creating the report. In one embodiment, fields 502 display labels 506a, 506b, 506c, 506d, 506e, etc., indicating the target data, and fields 502 also include value spaces 508a, 508b, 508c, 508d, 508e, etc. for inserting field values (e.g., target data). In one embodiment, as indicated by the field labels 506, fields 502 may be associated with metrics such as number of vulnerabilities, average scan time, average queue size, average lines of code, total lines of code, etc. For ease of illustration, 5 fields for 5 different metrics are shown in FIG. 5. More fields are possible depending on the implementation. For example, there may be fields for classes of vulnerabilities, sources of vulnerabilities, as well as other statistics, etc.

As indicated above, in one embodiment, the composition information enables system 116 to retrieve target data in real-time from one or more sources. Such sources may be internal or external to system 116. Also, as indicated above, the composition information contains all information necessary to retrieve target data. For example, in one embodiment, the composition information may include access credentials. In one embodiment, access credentials may include, for example, host names, Internet protocol (IP) addresses and uniform resource locators (URLs), data field names, user names, passwords, authentication information (e.g., authentication tokens, etc.), structured query language (SQL) statements, query string parameters, port numbers, operations, etc. In one embodiment, operations may include methods in which the data from one or more sources is combined. Such methods may include, for example, summaries, summations, averages, etc. In one embodiment, system 116 maintains a repository of composition information. In one embodiment, an administrator or data manager compiles the necessary composition information to fetch the target data from the various sources.

In block 408, system 116 receives a command to execute the report. In one embodiment, the user may issue the command by clicking on a button (e.g., a "run" button, "execute" button, etc.). In block 410, system 116 fetches the target data for each field using the composition information. As indicated above, each field contains composition information associated with a different item in the list of desired target data. As such, system 116 reads to the composition information in the fields and fetches the target data using the composition information. For example, system 116 may identify a particular source of target data using identifier information such as host names, Internet protocol (IP) addresses and uniform resource locators (URLs), etc, provided by the composition information. The sources may include sources internal to system 116 (e.g., system database 124, tenant database 122, etc. of FIG. 2). The sources may also include sources external to system 116 (e.g., external sources 302, 304, and 306, etc. of FIG. 3). System 116 may access the target data at the identified sources using user names, passwords, SQL statements, etc., provided by the composition information. In one embodiment, system 116 may also perform operations and/or transformations (e.g., averages) specified by the composite information. System 116 may also perform any web services calls to third-party providers (e.g., external sources 302 of FIG. 3) specified by the composite information. These third-party providers may include, for example, security analysis providers that may use security assessment and fraud detection tools, other on-line services systems, etc. Because system 116 dynamically fetches the target data directly from various sources both internal and external to system 116, the target data is current, up-to-date information.

In block 412, system 116 populates the fields with the target data. In particular, in one embodiment, system 116 inserts field values (e.g., the fetched target data) in the appropriate value spaces 508. Fetched target data may include a variety of statistics and information. For example, the target data may include results from a separate report showing security vulnerabilities, fraud warnings, fraud scoring, etc. from various security assessment providers. In one embodiment, these third-party providers run their own tools and methods (e.g., using honey clients) on their own servers, and may store test results externally and/or internally relative to system 116. As a result, the user receives current, up-to-date report real-time reports and aggregations of data across multiple on-demand systems. The user may then send the report to any one or more appropriate recipients (e.g., end customer, manager, etc.).

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for generating reports in an on-demand database system supporting multiple users and housing data for the multiple users, the method comprising:
   receiving, from one of the multiple users, a list of target data for a report, said list comprising a plurality of target sources including an internal target source located within the on-demand database system and an external target source located outside the on-demand database system;
   generating a plurality of fields in the report including a first field corresponding to said internal target source and a second field corresponding to said external target source, and each field comprising a field label, a field value space, and composite information for use in retrieving said field value from said target source;
   populating said fields with said composite information;
   receiving a command to execute the report;
   upon receiving the command to execute the report, fetching the target data from the internal and external target sources using said composite information in real time; and
   upon receiving the fetched target data from the internal and external target sources, populating, for each of said plurality of target sources, said field value space with a corresponding field value in real time in response to said command;
   wherein the composite information comprises all information, including access credentials, necessary to fetch the target data; and
   wherein the access credentials comprise, for the internal and the external target sources, one of: host names; Internet protocol (IP) addresses and uniform resource locators (URLs); data field names; user names; passwords; authentication information; structured query language (SQL) statements; query string parameters; and port numbers.

2. The method of claim 1, wherein the on-demand database system comprises a cloud-based database system.

3. The method of claim 1, wherein said composite information comprises information necessary to fetch the target data, and wherein the target is fetched from a plurality of sources.

4. The method of claim 2, wherein the on-demand database system comprises a multi-tenant database system.

5. The method of claim 4, wherein the multiple users correspond to multiple tenants of the multi-tenant database system, and further wherein the data for the multiple users comprises multiple tenant data.

6. The method of claim 5, wherein the internal target source is located within multiple tenant data.

7. The method of claim 1, wherein the fetching comprises performing web services calls to third-party providers.

8. A non-transitory computer-readable storage medium having instructions thereon for generating reports in a cloud-based database system supporting multiple users and housing data for the multiple users, the instructions when executed by a processor causing the processor to:
   receive, from one of the multiple users, a list of target data for a report, said list comprising a plurality of target sources including an internal target source located within the multiple user database system and an external target source located outside the multiple user database system;
   generate a plurality of fields in the report including a first field corresponding to said internal target source and a second field corresponding to said external target source, and each field comprising a field label, a field value space, and composite information for use in retrieving said field value from said target source;
   populate the fields with composite information;
   receive a command to execute the report;
   upon receiving the command to execute, fetch the target data from the internal and external target sources using said composite information; and
   upon receiving the fetched target data from the internal and external target sources, populate, for each of said plurality of target sources, said field value space with a corresponding field value in real time in response to said command;
   wherein the composite information comprises all information, including access credentials, necessary to fetch the target data; and
   wherein the access credentials comprise, for the internal and the external target sources, one or more of host names, Internet protocol (IP) addresses and uniform resource locators (URLs), data field names, user names, passwords, authentication information, structured query language (SQL) statements, query string parameters, and port numbers.

9. The non-transitory computer-readable storage medium of claim 8, wherein the cloud-based database system comprises a multi-tenant database system.

10. The non-transitory computer-readable storage medium of claim 8, wherein said composite information comprises information necessary to fetch the target data, and wherein the target is fetched from a plurality of sources.

11. The non-transitory computer-readable storage medium of claim 9, wherein the cloud-based multi-tenant database system comprises an on-demand database system.

12. The non-transitory computer-readable storage medium of claim 11, wherein the multiple users correspond to multiple tenants of the multi-tenant database system, and further wherein the data for the multiple users comprises multiple tenant data.

13. The non-transitory computer-readable storage medium of claim 12, wherein the internal target source is located within the multiple tenant data.

14. The non-transitory computer-readable storage medium of claim 8, wherein the instructions further cause the processor to perform web services calls to third-party providers.

15. An apparatus for generating reports in a multiple user database system supporting multiple users and housing aggregate data for the multiple users, the apparatus comprising:
   a processor; and
   a storage device storing one or more stored sequences of instructions which when executed by the processor cause the processor to:
      receive, from one of the multiple users, a list of target data for a report, said list comprising a plurality of target sources including an internal target source located within the aggregate data and an external target source located outside the multiple user database system;
      generate a plurality of fields in the report including a first field corresponding to said internal target sources and a second field corresponding to said external target source, and each field comprising a field label, a field value space, and composite information for use in retrieving said field value from said target source;
      populate the fields with composite information;
      receive a command to execute the report;
      upon receiving the command to execute, fetch the target data from the internal and external target sources using said composite information; and
      upon receiving the fetched target data from the internal and external target sources, populate, for each of said plurality of target sources, said field value space with a corresponding field value in real time in response to said command;
      wherein the composite information comprises all information, including access credentials, necessary to fetch the target data; and
      wherein the access credentials comprise, for the internal and the external target sources, one or more of host names, Internet protocol (IP) addresses and uniform resource locators (URLs), data field names, user names, passwords, authentication information, structured query language (SQL) statements, query string parameters, and port numbers.

16. The apparatus of claim 15, wherein the multiple user database system comprises an on-demand database system.

17. The apparatus of claim 16, wherein the on-demand database system comprises a cloud-based database system.

18. The apparatus of claim 17, wherein the multiple user database system comprises a multi-tenant database system.

19. The apparatus of claim 18, wherein the multiple users correspond to multiple tenants of the multi-tenant database system, and further wherein the data for the multiple users comprises multiple tenant data.

20. The apparatus of claim 19, wherein the internal target source is located within the multiple tenant data.

* * * * *